United States Patent
Arbe et al.

(10) Patent No.: US 9,712,668 B2
(45) Date of Patent: Jul. 18, 2017

(54) SYSTEMS AND METHODS FOR NOTIFYING ELECTRONIC DEVICES OF VOICE-BASED COMMUNICATION REQUESTS

(71) Applicant: GOGO LLC, Itasca, IL (US)

(72) Inventors: Armando Arbe, Schaumburg, IL (US); Premkumar Bangole, Bloomingdale, IL (US); Tony LaMarca, Loves Park, IL (US); Paresh Kanabar, Naperville, IL (US)

(73) Assignee: GOGO LLC, Chicago, IL (US)

( * ) Notice: Subject to any disclaimer, the term of this patent is extended or adjusted under 35 U.S.C. 154(b) by 226 days.

(21) Appl. No.: 14/267,400

(22) Filed: May 1, 2014

(65) Prior Publication Data

US 2015/0319300 A1    Nov. 5, 2015

(51) Int. Cl.
*H04M 3/42* (2006.01)
*H04L 29/06* (2006.01)

(52) U.S. Cl.
CPC .... *H04M 3/42042* (2013.01); *H04L 65/1006* (2013.01); *H04M 3/42195* (2013.01); *H04M 3/42365* (2013.01); *H04M 3/42382* (2013.01); *H04M 2201/60* (2013.01); *H04M 2203/651* (2013.01)

(58) Field of Classification Search
None
See application file for complete search history.

(56) References Cited

U.S. PATENT DOCUMENTS

| | | |
|---|---|---|
| 5,546,397 A | 8/1996 | Mahany |
| 5,557,656 A | 9/1996 | Ray et al. |
| 5,652,795 A | 7/1997 | Dillon et al. |
| 5,699,384 A | 12/1997 | Dillon |
| 5,722,074 A | 2/1998 | Muszynski |

(Continued)

FOREIGN PATENT DOCUMENTS

| | | |
|---|---|---|
| EP | 0 902 551 A2 | 3/1999 |
| EP | 1 976 152 A1 | 10/2008 |
| EP | 2 568 533 A1 | 3/2013 |

OTHER PUBLICATIONS

"Aero Mobile Terminals: Models 2540/2532" Product Sheet, ViaSat, 2 pp. (2012).

(Continued)

*Primary Examiner* — Huy D Vu
*Assistant Examiner* — Bao G Nguyen
(74) *Attorney, Agent, or Firm* — Marshall, Gerstein & Borun LLP; Randall G. Rush

(57) ABSTRACT

Embodiments are provided for notifying an electronic device connected to a non-terrestrial communication network of a voice-based communication request that is intended for the electronic device. According to certain aspects, a data center can receive the voice-based communication request that is initiated by an originating device. The data center can generate a text message that indicates the voice-based communication request and transmit the text message to the non-terrestrial communications network for delivery to the destination electronic device. The text message can identify the originating electronic device and enable the user of the destination electronic device to send an additional text message to the originating electronic device.

16 Claims, 8 Drawing Sheets

(56) References Cited

U.S. PATENT DOCUMENTS

| | | | |
|---|---|---|---|
| 5,740,366 A | 4/1998 | Mahany et al. | |
| 5,844,893 A | 12/1998 | Gollnick et al. | |
| 5,940,771 A | 8/1999 | Gollnick et al. | |
| 5,995,725 A | 11/1999 | Dillon | |
| 5,995,726 A | 11/1999 | Dillon | |
| 6,009,328 A | 12/1999 | Muszynski | |
| 6,016,388 A | 1/2000 | Dillon | |
| 6,125,184 A | 9/2000 | Dillon et al. | |
| 6,131,160 A | 10/2000 | Dillon et al. | |
| 6,161,141 A | 12/2000 | Dillon | |
| 6,310,582 B1 | 10/2001 | Uetake et al. | |
| 6,374,311 B1 | 4/2002 | Mahany et al. | |
| 6,665,536 B1 | 12/2003 | Mahany | |
| 6,697,415 B1 | 2/2004 | Mahany | |
| 6,714,559 B1 | 3/2004 | Meier | |
| 6,788,935 B1 | 9/2004 | McKenna et al. | |
| 7,013,138 B2 | 3/2006 | Mahany | |
| 7,062,268 B2 | 6/2006 | McKenna | |
| 7,107,062 B2 | 9/2006 | Cruz et al. | |
| 7,356,001 B1 * | 4/2008 | Jones | H04W 84/02 370/331 |
| 7,386,002 B2 | 6/2008 | Meier | |
| 7,457,646 B2 | 11/2008 | Mahany et al. | |
| 7,535,921 B2 | 5/2009 | Meier | |
| 7,536,167 B2 | 5/2009 | Gollnick et al. | |
| 7,548,553 B2 | 6/2009 | Meier | |
| 7,558,569 B2 | 7/2009 | Chang et al. | |
| 7,636,552 B2 | 12/2009 | Monk | |
| 7,702,328 B2 | 4/2010 | Lemond et al. | |
| 7,710,907 B2 | 5/2010 | Mahany | |
| 7,751,814 B2 | 7/2010 | Cruz et al. | |
| 7,873,343 B2 | 1/2011 | Gollnick et al. | |
| 7,916,747 B2 | 3/2011 | Meier | |
| RE42,536 E | 7/2011 | Leuca et al. | |
| 8,068,829 B2 | 11/2011 | Lemond et al. | |
| 8,078,163 B2 | 12/2011 | Lemond et al. | |
| 8,094,605 B2 | 1/2012 | Lynch et al. | |
| 8,169,946 B2 | 5/2012 | Lynch et al. | |
| 8,280,309 B2 | 10/2012 | Monk | |
| 8,452,276 B2 | 5/2013 | Lauer | |
| 2002/0170060 A1 | 11/2002 | Lyman | |
| 2006/0229070 A1 | 10/2006 | de La Chapelle et al. | |
| 2007/0021117 A1 | 1/2007 | McKenna et al. | |
| 2007/0042772 A1 | 2/2007 | Salkini et al. | |
| 2008/0004016 A1 | 1/2008 | Smee et al. | |
| 2008/0117893 A1 * | 5/2008 | Witzel | H04W 80/10 370/352 |
| 2008/0182573 A1 | 7/2008 | Lauer et al. | |
| 2008/0298354 A1 * | 12/2008 | Alves | H04L 65/1079 370/389 |
| 2009/0225732 A1 * | 9/2009 | Begall | H04W 88/184 370/338 |
| 2011/0265128 A1 | 10/2011 | Bengeult et al. | |
| 2013/0108032 A1 * | 5/2013 | Shaw | H04W 4/16 379/88.14 |
| 2014/0164228 A1 * | 6/2014 | Pathak | G06Q 20/227 705/39 |

OTHER PUBLICATIONS

"Direcway™ DW3000/DW4000 Series Systems: Satisfying the Need for Speed for the Multimedia Internet," Hughes Network Systems, 2 pp. (Jun. 2001).

"Exede® Internet: Fastest In-Flight Wi-Fi Unleash the Internet," ViaSat, 4 pp. (2012).

"Gogo Partners with AeroSat to Bring Ku-Satellite Service to Market," Gogo LLC, 2 pp. (May 18, 2012).

"Hughes and ThinKom Demonstrate New Tactical Communications Solutions," press release, Hughes Network Systems, LLC, 2 pp. (Oct. 25, 2012).

"Hughes HX200 Broadband Satellite Router," Hughes Network Systems, LLC, 2 pp. (2012).

ETSI Technical Specification 102 441 (v1.1.1), "Digital Video Broadcasting (DVB); DVB-S2 Adaptive Coding and Modulation for Broadband Hybrid Satellite Dialup Applications", European Telecommunications Standards Institute (ETSI), European Broadcasting Union, 23 pp. (2005).

European Standard 301 195 (v1.1.1), "Digital Video Broadcasting (DVB); Interaction channel through the Global System for Mobile communications (GSM)," European Telecommunications Standards Institute (ETSI), 14 pp. (Feb. 1999).

European Telecommunication Standard (ETS 300 801), "Digital Video Broadcasting (DVB); Interaction channel through Public Switched Telecommunications Network (PSTN) / Integrated Services Digital Networks (ISDN)," European Telecommunications Standards Institute (ETSI), 14 pp. (Aug. 1997).

* cited by examiner

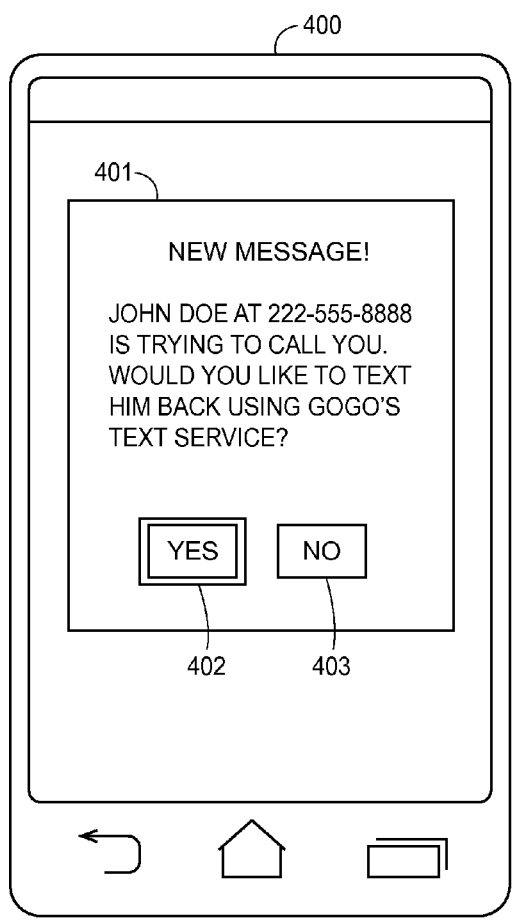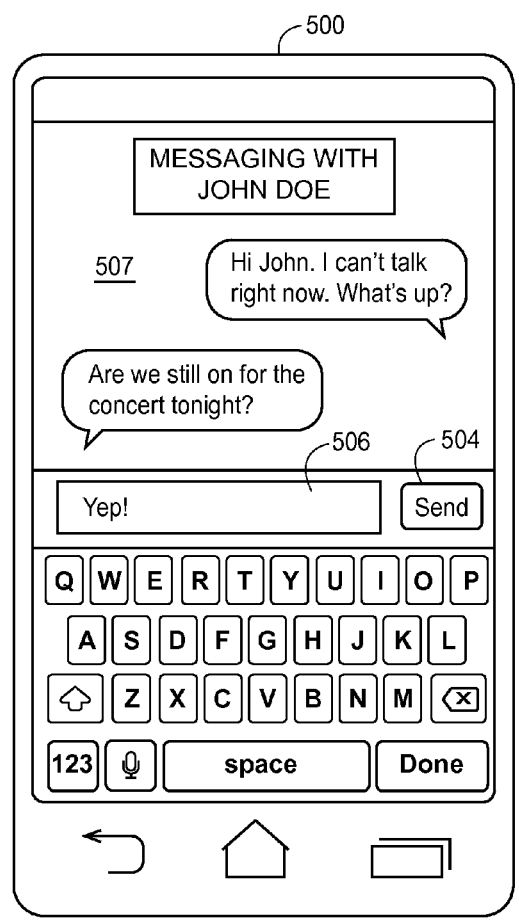
FIG. 4
FIG. 5

US 9,712,668 B2

SYSTEMS AND METHODS FOR NOTIFYING ELECTRONIC DEVICES OF VOICE-BASED COMMUNICATION REQUESTS

FIELD

The present disclosure generally relates to cellular-based communications and, in particular, to systems, methods, and techniques for notifying an electronic device connected to a non-terrestrial communication network of a voice-based communication that is intended for the electronic device.

BACKGROUND

Currently, existing airlines and other transportation companies provide various services to mobile or wireless devices (e.g., cellular phones, smart devices, laptops, tablet computers, etc.) when such devices are on-board a vehicle while the vehicle is in en route to a destination. For example, some existing communications systems are able to provide internet-based network connections to mobile devices while on-board a vehicle, such as through Wi-Fi capability. Some other systems exist to support the delivery of terrestrial or native features (e.g., roaming, texting, simultaneous calls, etc.) to mobile or wireless devices while a vehicle is in transit. In particular, to support native, terrestrial features of a mobile or wireless device in a non-terrestrial environment, an on-board communications network system facilitates communications between mobile devices and a ground-based data center.

However, certain regulations exist that restrict certain types of communications. For example, although considering a change, the Federal Communications Commission (FCC) currently has a regulation that prohibits airplane passengers from receiving voice calls. Even if this regulation is lifted, commercial airlines may still not permit its passengers to receive voice calls. Therefore, if a calling party places a call that is intended for an individual who is in flight, the call will not be connected. As a result, the calling party may not know why the call was not connected, especially if the calling party does not know that the individual is in flight, and the individual in flight will not be aware that the calling party is attempting contact. This can especially pose a problem if the calling party is attempting to reach the individual in cases of emergency or urgent news.

Accordingly, there is an opportunity to leverage various communications infrastructure components to better manage incoming voice-based communication requests. In particular, there is an opportunity to notify the calling party that a call cannot be connected and to notify a destination party that the calling party is attempting contact. Further, there is an opportunity to compile usage data related to voice call attempts in an effort to improve service.

SUMMARY

In an embodiment, a method of processing communication requests intended for a destination electronic device connected to an on-board communications network is provided. The method includes receiving a voice-based communication request that is (1) initiated by an electronic device connected to a terrestrial network and (2) intended for the destination electronic device, the voice-based communication request comprising a subscription identification associated with the destination electronic device. The method further includes using, by a processor, the subscription identification to identify an identification of the destination electronic device, generating, by the processor, a text-based message that indicates the voice-based communication request and the identification of the destination electronic device, and transmitting the text-based message to the on-board communications network for delivery to the destination electronic device.

In another embodiment, a system for processing communication requests intended for a destination electronic device connected to an on-board communications network is provided. The system includes a communication module configured to send and receive data and a data center communicatively connected to the communication module. The data center is configured to receive, via the communication module, a voice-based communication request that is (1) initiated by an electronic device connected to a terrestrial network and (2) intended for the destination electronic device, the voice-based communication request comprising a subscription identification associated with the destination electronic device. The data center is further configured to use the subscription identification to identify an identification of the destination electronic device, generate a text-based message that indicates the voice-based communication request and the identification of the destination electronic device, and transmit, via the communication module, the text-based message to the on-board communications network for delivery to the destination electronic device.

BRIEF DESCRIPTION OF THE DRAWINGS

FIG. 4 is an example interface illustrating various communication facilitation techniques, in accordance with some embodiments.

FIG. 5 is an example interface illustrating various communication facilitation techniques, in accordance with some embodiments.

DETAILED DESCRIPTION

Figure 1:
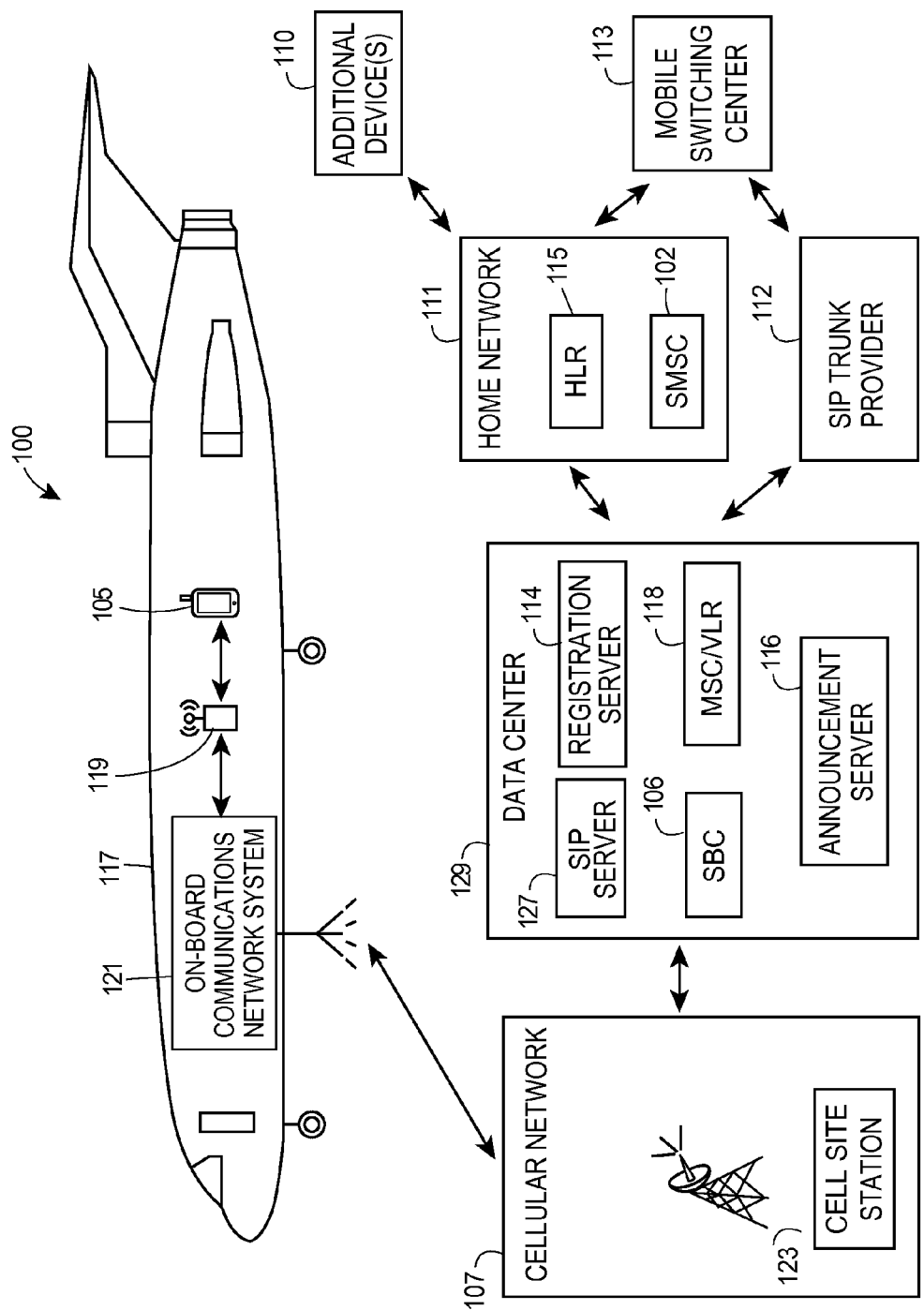
FIG. 1 illustrates an exemplary representation of electronic devices and components capable of facilitating cellular-based communications among electronic devices, in accordance with some embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The systems and methods may be facilitated by a back-end registration server as well as a communication application installed on an electronic device. During a registration of an electronic device with the registration server, the registration server sends a location update for the electronic device to the home network of a user of the electronic device and the home network updates its home location register (HLR) accordingly. Therefore, the location of the electronic device is known within the terrestrial mobile network and the electronic device is configured to roam and send and receive various communications.

The systems and methods as discussed herein offer efficient and effective techniques for facilitating text- and voice-based communications among electronic devices. In particular, one of the electronic devices that participates in the communication is connected to a non-terrestrial network (e.g., an air-borne network) and another of the electronic devices that participates in the communication is connected to a terrestrial network (e.g., a ground-based network). In certain situations, such as due to FCC regulations or airline policies, the air-borne electronic device may not be permitted to participate in voice-based communications with the ground-based electronic device. Therefore, the air-borne electronic device may not be able to respond to or accept a voice-based communication attempt that originates from the ground-based electronic device.

A user of the ground-based originating device may not be aware that a user of the air-borne destination device is in flight. Accordingly, when the voice-based communication attempt does not connect to the air-borne destination device, the user of the ground-based originating device may not know why the communication attempt does not connect and may therefore become frustrated. Further, the user of the ground-based originating device may be unaware that the user of the air-borne destination device is not notified of the communication attempt. The systems and methods examine the voice-based communication request from the originating device and determine that the destination device is, in fact, on a flight and is therefore not able to receive the voice-based communication request. In one embodiment, the systems and methods generate a custom audio announcement that indicates the unavailability of the air-borne destination device and provide the custom audio announcement to the originating device. Thus, the user of the originating device is informed that the user of the air-borne destination device is not able to receive (and therefore did not receive) the voice-based communication attempt.

In another embodiment, the systems and methods generate a text message in response to determining that the destination device is on the flight and is not able to receive the voice-based communication attempt. The text message indicates the voice-based communication attempt and identifies the originating device (e.g., a contact phone number). The systems and methods send the text message to the in-flight destination device, which presents the text message to the user of the in-flight destination device and enables the user to send and receive additional text messages to and from the originating device. Accordingly, the user of the in-flight destination device is notified of the communication attempt and is able to communicate with the originating device via text messages in lieu of voice-based communication.

The systems and methods offer numerous advantages and benefits. In particular, the systems and methods notify an originating device of the unavailability of a destination device when the destination device is in an environment that does not permit a particular communication that is initiated by the originating device. Further, the systems and methods notify, using a text message, the destination device that the originating device is attempting to communicate with the destination device via a voice-based communication. Additionally, the user of the destination device is able view the text message and converse with the user of the originating device via one or more additional text messages. Moreover, the systems and methods enable communication service providers to gather data relating to the communications and the communication attempts. The communication service providers can use the data to improve existing services and add new services. Further, the communication service providers can use the data to lobby certain agencies or companies (e.g., the FCC or various airlines) to modify or repeal certain communication-based regulations. It should be appreciated that other advantages and benefits of the systems and methods are envisioned.

FIG. 1 illustrates an example representation 100 of components configured to facilitate communications among electronic devices. In particular, the components of the representation 100 are configured to re-direct a voice-based communication that is initiated by an additional device 110 and intended for an electronic device 105 connected to an on-board communications network system 121. Further, the components of the representation 100 are configured to notify (e.g., via a short message service (SMS) message) the electronic device 105 that the additional device 110 is attempting to initiate a voice-based communication. Generally, as referred to herein, a "terrestrial-based" or "ground-based" network refers to any network that electronic devices may connect to while in a terrestrial environment, but may not easily communicate via while being transported by a high-speed or high-elevation vehicle such as an airplane. Similarly, a "non-terrestrial-based" or "non-ground-based" network refers to any network that electronic devices may connect to while not in range of a ground-based network or while not able to easily connect to a ground-based network, such as while the electronic devices are being transported by a high-speed or high-elevation vehicle such as an airplane. Typically, ground systems and ground computing devices may be essentially fixed in location, and base stations or infrastructure containing equipment via which devices may wirelessly access the ground system may be contained in one or more buildings or other structures that are fixedly attached to the ground or to earth.

Each of the electronic device 105 and the additional device 110 may be any type of standalone or portable electronic device capable of communicating via one or more networks. For example, each of the electronic device 105 and the additional device 110 may be a mobile phone, a Personal Digital Assistant (PDA), a smart phone, a tablet computer, a multimedia player, a desktop or notebook computer, an MP3 player, a digital broadcast receiver, or any other electronic apparatus. Each of the electronic device 105 and the additional device 110 may also have a subscription or plan with a cellular services provider, whereby the cellular services provider supports cellular communications conducted via the electronic device 105 and/or the additional device 110.

As illustrated in FIG. 1, the electronic device 105 is transported by or otherwise located within a vehicle 117. In embodiments, the vehicle 117 may be owned and/or operated by an individual, or the vehicle may be owned and/or operated by a company, organization or governmental entity. The vehicle 117 may be one of a fleet of vehicles. The vehicle 117 may be used to transport passengers who pay for or otherwise are granted passage on the vehicle. The vehicle 117 may be used to transport executives or staff of a company or organization and their guests. The vehicle 117 may be used to transport live or inanimate cargo, packages, mail, and/or other types of passengers or cargo. Furthermore, although FIG. 1 depicts the vehicle 117 as an aircraft, the techniques and principles described herein equally apply to other types of vehicles such as trucks, automobiles, busses, trains, boats, ships, barges, subway cars, helicopters, ambulances or other emergency vehicles, military vehicles, other air-borne, water-borne, or land-borne vehicles, and vehicles that are suitable for space travel.

The vehicle 117 is equipped with a wireless access point 119 and the on-board communications network system 121. At any given moment in time, the on-board communications network system 121 may be in communicative connection with one or more data or communications networks that are disposed, managed, and/or hosted, for the most part (if not entirely), externally to the vehicle 117. For example, an external network may be a public, ground-based data or communications network, such as the Internet and/or the PSTN (Public Switched Telephone Network). The external network may also be a ground-based private data and/or communications network. Further, the external network may be a cellular network 107 that includes a cell site station 123. Generally, the external network includes ground systems and ground computing devices that are essentially fixed in location. Further, the external network includes base stations or infrastructure containing equipment via which devices may wirelessly access the external network. The base stations or infrastructure containing equipment may be contained in one or more buildings or other structures that are fixedly attached to the ground or to earth.

The electronic device 105 can connect to the on-board communications network system 121 via the wireless access point 119. Generally, the on-board communications network system 121 may be disposed, managed, and/or hosted entirely on-board the vehicle 117. For example, the on-board communications network system 121 may be a Wi-Fi network that is contained and operates within the cabin of the vehicle 117. The on-board communications network system 121 may utilize any known communication protocol or combinations thereof, such as a wireless protocol, a wired protocol, other ARINC standard-compatible protocols, or a private protocol. In an example, the on-board communications network system 121 utilizes an IEEE 802.11 compatible protocol to communicate with the electronic device 105. In another example, the on-board communications network system 121 utilizes a hypertext transfer protocol (HTTP) and a Near Field Communications (NFC)-compatible protocol (e.g., Bluetooth®) to communicate with the electronic device 105.

The on-board communications network system 121 can also facilitate and manage communications between the electronic device 105 and the cell site station 123 of the cellular network 107. According to embodiments, the on-board communications network system 121 and the cell site station 123 may collectively make up an air-to-ground (ATG) communication network for aircraft use. In embodiments, the on-board communications network system 121 and the cell site station 123 can facilitate any type of data communication via any wireless standard or technology (e.g., GSM, CDMA, TDMA, WCDMA, LTE, EDGE, OFDM, GPRS, EV-DO, UWB, and others).

The cell site station 123 of the cellular network 107 can connect, via one or more various wired or wireless networks, to a ground-based data center 129 having components for securely facilitating communications between the electronic device 105 and other electronic devices, such as the additional device 110. In particular, the ground-based data center 129 includes a session border controller (SBC) 106, a session initiation protocol (SIP) server 127, an SIP registrar (not shown in FIG. 1), a visitor location register (VLR) 118, and a registration server 114. The SIP server 127 may be any combination of hardware and software elements configured to directly or indirectly communicate with the electronic device 105 and the additional device 110, and facilitate the functionalities and communications described herein. Further, the SBC 106 and the SIP server 127 can facilitate and manage communication sessions among the electronic device 105, the additional device(s) 110, and the data center 129 using the SIP signaling communications protocol. The registration server 114 provides subscriber location information to the SIP server 127.

In existing systems, a user of the additional device 110 may not be aware that the electronic device 105 is not able to receive voice calls (as a result, for example, of not being aware that the electronic device 105 is in flight). Accordingly, the data center 129 can further include an announcement server 116, which may be separate from or a part of the SBC/SIP server 127 and/or the registration server 114. The announcement server 116 can be configured to store or generate an audio announcement or message that informs an originating device (i.e., the additional device 110) of the unavailability of a destination device (i.e., the electronic device 105). The announcement server 116 may also provide the audio announcement to the SBC/SIP server 127 for delivery to the originating device (i.e., the additional device 110).

According to embodiments, the electronic device 105 can download and install a communication application (not shown in FIG. 1) that enables cellular-based communications when the electronic device 105 is located in the vehicle 117. Further, the electronic device 105 can use the communication application to register and create an account with the registration server 114 to enable the electronic device 105 to communicate over various air-borne communication networks, such as an air-to-ground (ATG) communication network for aircraft use.

As illustrated in FIG. 1, the registration server 114 may connect, via a cellular-based network, to a home network 111 associated with the electronic device 105. The cellular-based network may be a wide area network (WAN) configured to facilitate any type of data communication via any standard or technology (e.g., GSM, CDMA, TDMA, WCDMA, LTE, EDGE, OFDM, GPRS, EV-DO, UWB, and others). Generally, the home network 111 of the electronic device 105 may be administered or provided by a cellular communications service provider with which the user (i.e., subscriber) of the electronic device 105 has an agreement to send and receive wireless communications services and features. Accordingly, the home network 111 of the electronic device 105 may administrate or manage a home location register (HLR) 115, among other databases or components, to support and manage cellular communication, roaming, and other features for the electronic device 105 according to the services agreement. Additionally, the cellular radio frequency (RF) communications band utilized by the home network 111 to wirelessly communicate with mobile devices may be an RF band designated for AMPs, TDMA, CDMA, GSM, PCS, 3G, 4G, 5G, and/or any other terrestrial cellular radio frequency band. Generally, a cellular radio frequency band is a portion of RF spectrum that is allocated by a governmental agency or other body which governs the usage of spectrum. In some networks, more than one cellular RF band may be supported.

The HLR 115 can include a database that stores identifications of electronic devices that are authorized to communicate via the home network 111. In some cases, according to the Global System for Mobile Communications (GSM) protocol, for each authorized device, the HLR 115 can store the corresponding international mobile station identity (IMSI), which is a unique number that identifies each authorized device (or more particularly, identifies the SIM card of each authorized device). In other cases, according to the code division multiple access (CDMA) protocol, the mobile identification number (MIN) may identify the authorized device. The HLR 115 can also pair each IMSI with a mobile subscriber integrated services digital network number (MSISDN) that corresponds to a telephone number of the authorized device. The corresponding subscriber identity for the CDMA protocol is the mobile directory number (MDN). It should be appreciated that descriptions of the GSM and CDMA protocols herein and terms relating thereto may be used interchangeably. The home network 111 further includes a short message service center (SMSC) 102 configured to store, forward, convert, and deliver cellular-based messages (e.g., text messages such as SMS messages). In particular, the SMSC 102 can forward, to the data center 129, messages originated by the additional device 110 and intended for the electronic device 105. Further, the SMSC 102 can send, to the additional device 110, messages received from the electronic device 105 via the data center 129.

The data center 129 can further be configured to communicate with an SIP trunk provider 112. According to embodiments, the SIP trunk provider 112 enables voice over IP (VoIP) and streaming media communications by which internet telephony service providers (ITSPs) deliver telephone services and unified communications to customers equipped for SIP-based communications. Each of the home network 111 and the SIP trunk provider 112 (as well as the data center 129) may communicate with a mobile switching center (MSC) 113. According to embodiments, the MSC 113 routes voice calls and other messaging services to and from end devices, such as the electronic device 105 and the additional device(s) 110. In particular, the MSC 113 sets up and releases end-to-end connections, and manages mobility and hand-over requirements during calls, among other services as known in the art.

According to embodiments, the components of the representation 100 are configured to facilitate the communication of cellular-based communications between and among the electronic device 105 and the one or more additional devices 110. In particular, the additional device 110 can place or initiate a voice call that is intended for the electronic device 105. Because the electronic device 105 is connected to the on-board communications network system 121 (i.e., is in flight), the electronic device 105 may not be authorized to receive and participate in voice calls. For example, the user of the electronic device 105 may be on a commercial airlines flight on an airline that restricts the receipt of voice calls. The data center 129 can receive, from the MSC 113, a voice call originating from the additional device 110. In one embodiment, the data center 129 can generate a text-based message (e.g., a SIP message) and send the text-based message to the on-board communications network system 121 for delivery to the electronic device 105. The text-based message can indicate that the additional device 110 is attempting to connect to the electronic device 105 via a voice call. Further, the electronic device 105 can enable a user to input an additional text-based message and send the additional text-based message to the additional device 110.

In another embodiment, the data center 129 (or more specifically, the announcement server 116) can generate a custom audio announcement indicating that the electronic device 105 is not able to receive voice calls. The data center 129 can send establish a communication channel with the additional device 110 via the SIP trunk provider 112 and/or the MSC 113, and can send the custom audio announcement to the additional device 110 via the communication channel. The additional device 110 can annunciate the custom audio announcement to inform the user of the additional device 110 that the electronic device 105 is not available to receive voice calls. Accordingly, the user of the additional device 110 is notified that the electronic device 105 did not receive the communication attempt and that the user of the electronic device 105 may not be aware of the communication attempt.

Figure 2:
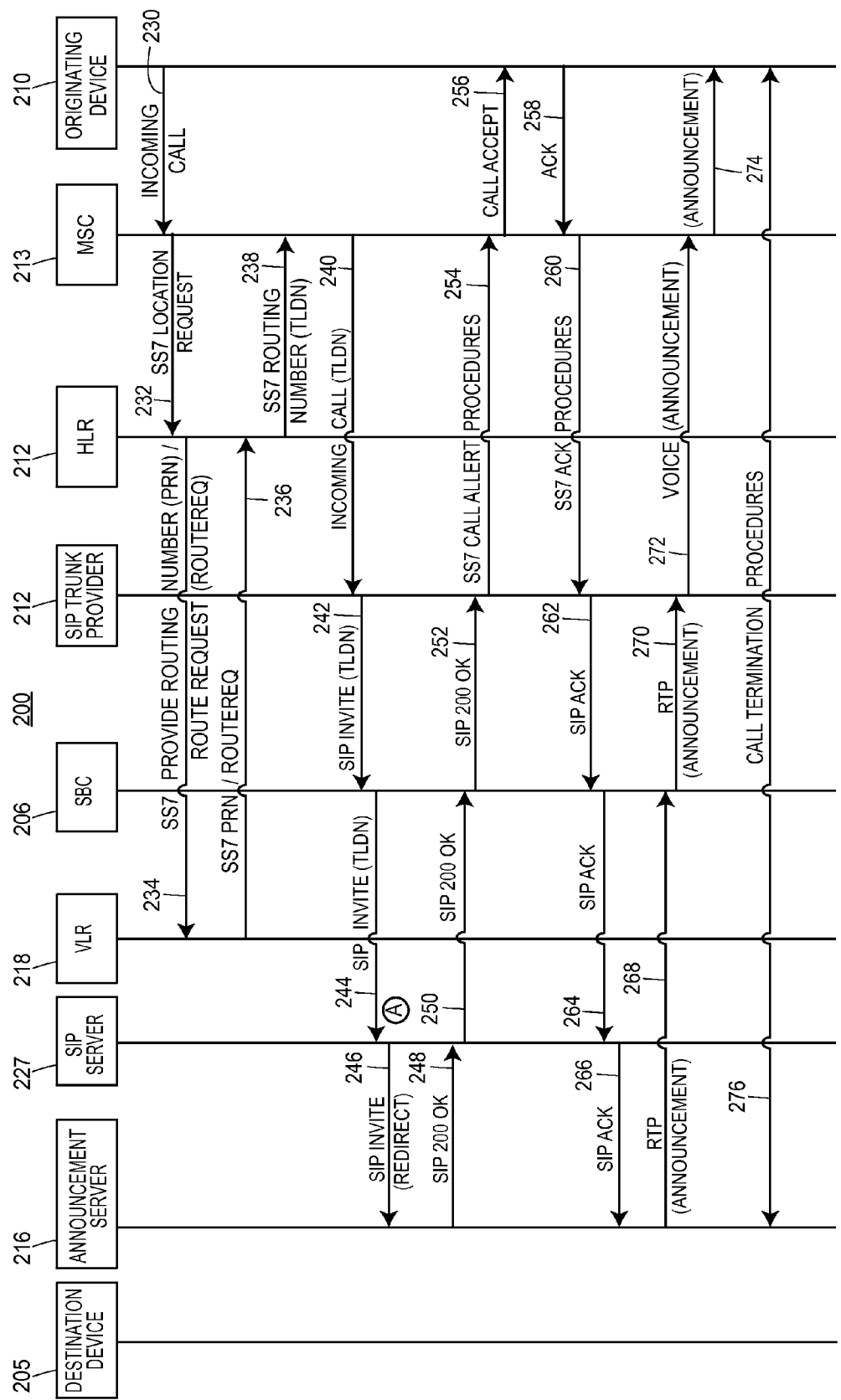
FIG. 2 depicts an example signal diagram associated with re-directing a voice-based communication that is intended for an electronic device connected to a non-terrestrial network, in accordance with some embodiments.

FIG. 2 illustrates a signal diagram 200 associated with facilitating a voice-based communication request that originates from an originating device 210 connected to a terrestrial-based network. Further, the voice-based communication request is intended for a destination device 205 that is connected to a non-terrestrial-based network, such as if the destination device 205 is located on board a vehicle such as an aircraft. The signal diagram 200 includes the destination device 205 (such as the electronic device 105 as discussed with respect to FIG. 1), an announcement server 216 (such as the announcement server 116 as discussed with respect to FIG. 1), an SIP server 227 (such as the SIP server 127 as discussed with respect to FIG. 1), an MSC/VLR 218 (such as the MSC/VLR 118 as discussed with respect to FIG. 1), an SBC 206 (such as the SBC 106 as discussed with respect to FIG. 1), an SIP trunk provider 212 (such as the SIP trunk provider 112 as discussed with respect to FIG. 1), an HLR 215 (such as the HLR 115 as discussed with respect to FIG. 1), a mobile switching center 213 (such as the mobile switching center 113 as discussed with respect to FIG. 1), and the originating device 210 (such as the additional device 110 as discussed with respect to FIG. 1). For purposes of discussion, it should be appreciated that the destination device 205 has already completed the registration procedure with a registration server, and optionally has also purchased a product or service that enables cellular-based communication via the non-terrestrial-based network.

A user of the originating device 210 can use the originating device 210 to initiate the voice-based communication request. In particular, the user can use a telephone application to input a telephone number associated with the destination device 205, and select to initiate the phone call. In some cases, the voice-based communication request may correspond to a VoIP call. As illustrated in FIG. 2, the originating device 210 can place (230) the voice-based call, which is routed to the MSC 213. The MSC 213 can send (232) a location request (LR) for the destination device 205 to the HLR 215. The HLR 215 examines a destination of the call (i.e., the destination device 205) and can send (234) a provide routing number (PRN)/route request (ROUTEREQ) request to the VLR 218, and the MSC/VLR 218 can allocate a routing number for the destination device 205 and provide (236) the routing number to the HLR 215. In some cases, a subscriber database associated with the registration server can identify flight details associated with the destination device 205 based on an earlier registration. For example, the subscriber database can indicate a flight type (commercial or business), flight number, airline, airline ID, departure and arrival times, and/or other data. The MSC/VLR 218 can generate the routing number based on the flight details. In embodiments, the routing number may be a temporary local directory number (TLDN) associated with the destination device 205. After receiving the routing number, the HLR 215 can send (238) the routing number (e.g., TLDN) to the MSC 213, and the MSC 213 can initiate (240) an incoming call request to the SIP trunk provider 212 using the routing number.

After receiving the incoming call request, the SIP trunk provider 212 can generate an SIP invite message that includes the routing number and send (242) the SIP invite message to the SBC 206. By interfacing with the registration server, the SIP server 227 may translate the routing number in the SIP invite message into the subscriber identity associated with the destination device 205. Accordingly, the SBC 206 can send (244) the SIP invite message specifying the subscriber identify to the SIP server 227. The SIP server 227 can facilitate one or more functionalities to manage the voice-based communication request. In some cases, indicated by "A" in FIG. 2 and "A" in FIG. 3, the SIP server 227 can generate a text message and deliver the text message to the destination device 205. In other or additional cases, the SIP server 227 can facilitate the delivery of an audio announcement to the originating device 210, which is described below and additionally illustrated in FIG. 2.

In cases in which the SIP server 227 facilitates the delivery of an audio announcement, the SIP server 227 can forward (246) the SIP invite message to the announcement server 216. The announcement server 216 can send (248) an SIP 200 OK response to the SIP server 227, which can forward (250) the SIP 200 OK response to the SBC 206, which can forward (252) the SIP 200 OK response to the SIP trunk provider 212. After receiving the SIP 200 OK response, the SIP trunk provider 212 can send (254) call accept procedures to the MSC 213, which can send (256) a call accept request to the originating device 210. The originating device can respond (258) with an acknowledgement, and the MSC 213 can send (260) acknowledgement procedures to the SIP trunk provider 212. The SIP trunk provider 212 can send (262) an SIP acknowledgement to the SBC 206, which forwards (264) the SIP acknowledgement to the SIP server 227, which forwards (266) the SIP acknowledgement to the announcement server 216.

The announcement server 216 can generate an audio announcement based on the voice-based communication request. In particular, the announcement server 216 can generate a text-to-speech voice audio file that indicates that the destination device 205 is not available to receive voice calls. The announcement server 216 can also add identifying information (e.g., a name of the user of the destination device 205, the MSISDN/MDN of the destination device 205, etc.) to the audio announcement. For example, the audio announcement can recite the text "The person at phone number 111-222-7777 is not available receive telephone calls at this time. Please try your call at a later time." In embodiments, the audio announcement may be a .wav file, an .mp3 file, or any other type of audio file.

The announcement server 216 can establish an RTP session with the SBC 206 and can send (268) the announcement to the SBC 206 via the RTP session. The SBC 206 can establish an RTP session with the SIP trunk provider 212 and send (270) the announcement to the SIP trunk provider 212. The SIP trunk provider 212 can send (272) the voice announcement to the MSC 213, which can forward (274) the voice announcement to the originating device 210. The originating device 210 can annunciate the audio announcement, for example via a speaker component. In embodiments, the originating device 210 annunciates the announcement during the same "call session" that the originating device 210 used to initiate the call in (230). Therefore, the user of the originating device 210 is able to both place the call and be notified of the unavailability of the destination device 205 in the same communication. To terminate the call session, the announcement server 216 and the originating device 210 can facilitate (276) call termination procedures.

In some embodiments, the SIP server 227 can update a log or memory record associated with the voice-based communication facilitation. In particular, the log can be associated with the specific flight or airline on which the destination device 205 is traveling, or can be a cumulative log that represents various amounts of communication requests that the SIP server 227 has managed. According to embodiments, SIP server 227 can update the log to reflect that the voice-based communication request has been received, that the custom announcement has been generated, and/or other metrics. Further, the SIP server 227 may compile the log data to create revenue opportunities, to improve service, or for other benefits.

Although not discussed with respect to FIG. 2, it should be appreciated that the SIP server 227 may facilitate other types of communications with the originating device 210 to notify the originating device 210 that the destination device 205 is not available for voice communication. For example, the SIP server 227 can generate a text-based message indicating that the destination device 205 is not available for voice-based communication but is available for text-based communication. It should be appreciated that other types of notifications are envisioned.

Figure 3:
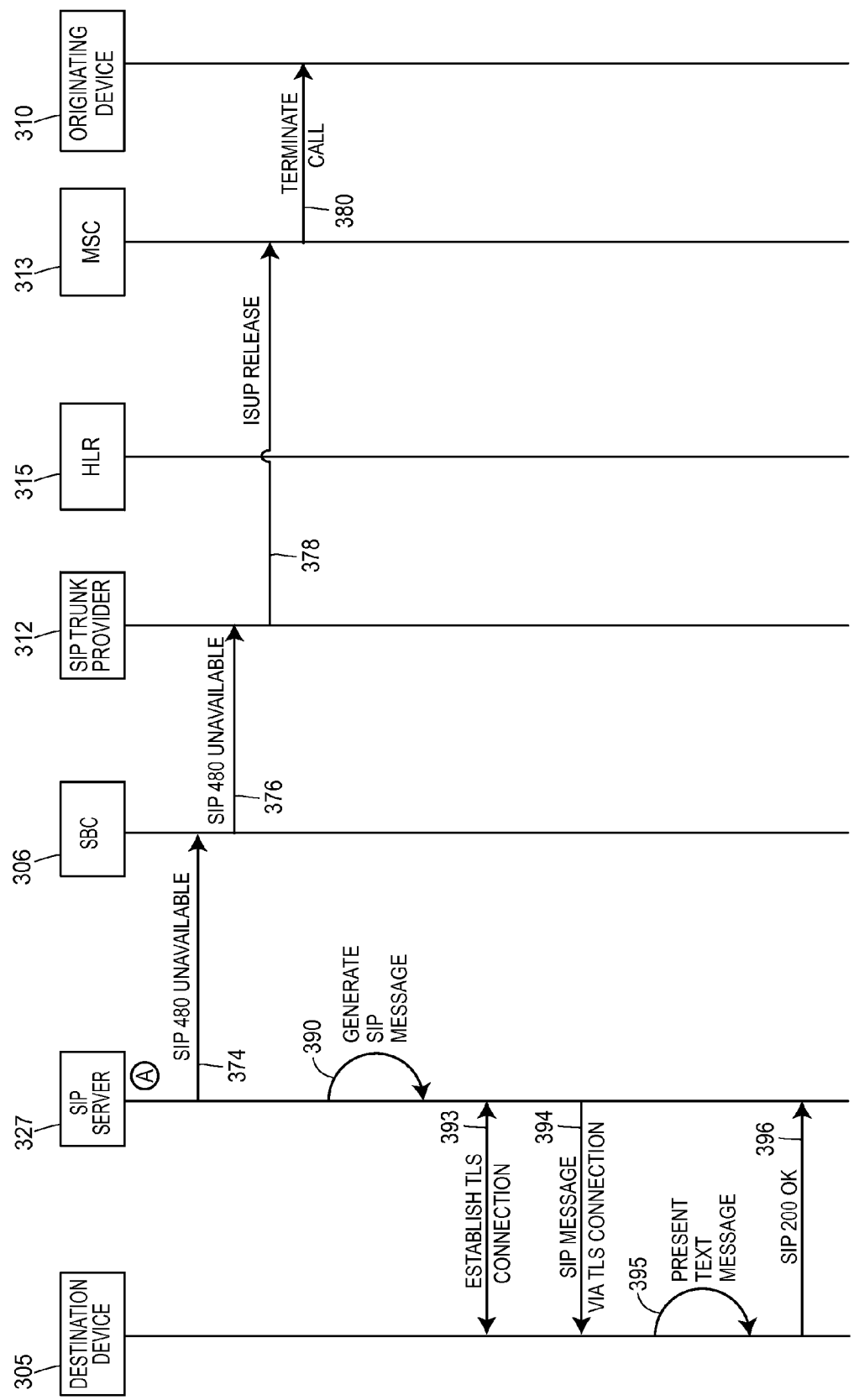
FIG. 3 depicts an example signal diagram associated with notifying an electronic device connected to a non-terrestrial network of a voice-based communication that is intended for the electronic device, in accordance with some embodiments.

FIG. 3 illustrates a signal diagram 300 associated with notifying a destination device 305 connected to a non-terrestrial-based network (such as if the destination device 305 is located on board a vehicle such as an aircraft) that an originating device 310 has attempted a voice-based communication. The signal diagram 300 includes the destination device 305 (such as the electronic device 105 as discussed with respect to FIG. 1), an SIP server 327 (such as the SIP server 127 as discussed with respect to FIG. 1), an SBC 306 (such as the SBC 106 as discussed with respect to FIG. 1), an SIP trunk provider 312 (such as the SIP trunk provider 112 as discussed with respect to FIG. 1), an HLR 315 (such as the HLR 115 as discussed with respect to FIG. 1), a mobile switching center 313 (such as the mobile switching center 113 as discussed with respect to FIG. 1), and the originating device 310 (such as the additional device 110 as discussed with respect to FIG. 1).

The "A" in FIG. 3 represents a starting point for functionality that the SIP server 327 may facilitate after the originating device 310 initiates the voice call, as discussed with respect to FIG. 2. Referring to FIG. 3, the SIP server 327 can send (374) an SIP 480 unavailable message to the SBC 306, and the SBC 306 can forward (376) the SIP 480 unavailable message to the SIP trunk provider 312. The SIP trunk provider 312 can send (378) an ISUP release message to the MSC 313 to cause the MSC 313 to terminate (380) the voice-based call with the originating device 310.

The SIP server 327 can generate (390) an SIP message to be sent to the destination device 305, where the SIP message can indicate that the originating device 310 is attempting to initiate a voice call with the destination device 305, as well as indicate an option for the destination device 305 to communicate with the originating device 310. For example, the SIP message can include the text "Hello, the person at 222-555-8888 is attempting to call you. You may want to text this person using our texting service." In some embodiments, the SIP server 327 can also update a log or memory record associated with the voice-based request. In particular, the log can be associated with the specific flight or airline on which the destination device 305 is traveling, or can be a cumulative log that represents various amounts and types of communication requests. The SIP server 327 can update the log to reflect that the voice-based communication request has been received, that the text message has been generated, and/or other metrics.

The SIP server 327 can establish (393) a TLS connection with the destination device 305 using a digital certificate or according to other techniques. Further, the SIP server 327 can send (394) the SIP message to the destination device 305 via the established TLS connection. The destination device 305 can present (395) the SIP message to a user of the destination device 305. In some embodiments, the destination device 305 can present the body or textual portion of the SIP message via an application installed on the destination device 305. After receiving the SIP message, the destination device 305 can send (395) a message received acknowledgement (e.g., an SIP 200 OK message) to the SIP server 327. In some cases, the SIP server 327 can facilitate sending an acknowledgement to the originating device 310 that informs a user of the originating device 310 that the destination device 305 has received the message.

Referring to FIGS. 4 and 5, depicted are example interfaces associated with the voice communication managing techniques as discussed herein. An electronic device (such as the electronic device 105) can display the example interfaces on a user interface and enable a user to interact with the example interfaces via the user interface. According to embodiments, the electronic device can display the interfaces in situations in which the electronic device is connected to a non-terrestrial network (e.g., the on-board communications network system 121) and when another device (e.g., the additional device 110) is attempting to place a voice call to the electronic device.

As illustrated in FIG. 4, an example interface 400 presents a notification 401 indicating a communication attempt with the electronic device. In particular, the notification 401 includes a message indicating that example user "John Doe" is trying to reach the electronic device via a voice call. It should be appreciated that the notification 401 may be associated with a dedicated communication application associated with the non-terrestrial network (e.g., as shown, the "Gogo Text Service") or with another application (e.g., a native messaging application). The notification 401 can further include selectable options 402, 403 that enable a user to either communicate with the calling party or ignore the notification 401. For example, if the user selects the "NO" option 403, the electronic device may dismiss the notification 401. For further example, if the user selects the "YES" option 402, the electronic device may initiate an application that may be used to compose a message and send the message to the party that is attempting to reach the electronic device.

If the user selects the "YES" option 402, the electronic device can display an example interface 500 as depicted in FIG. 5. The interface 500 includes a text input area 506 into which a user of the electronic device may input a message. The interface 500 also includes a send selection 504 that, when selected, causes the electronic device to send the inputted message to the end device. In particular, the end device is the device that initiated the voice call request to the electronic device. The interface 500 enables the user to engage in a messaging conversation with the user of the originating device, whereby the interface 500 displays, in a messaging window 507, messages that the electronic device has previously sent to the originating device as well as messages that the electronic device has received from the originating device. Accordingly, the user of the electronic device is able to communicate with the user of the originating device when the electronic device would have normally not have received any notification that the originating device attempted the voice-based communication.

Figure 6:
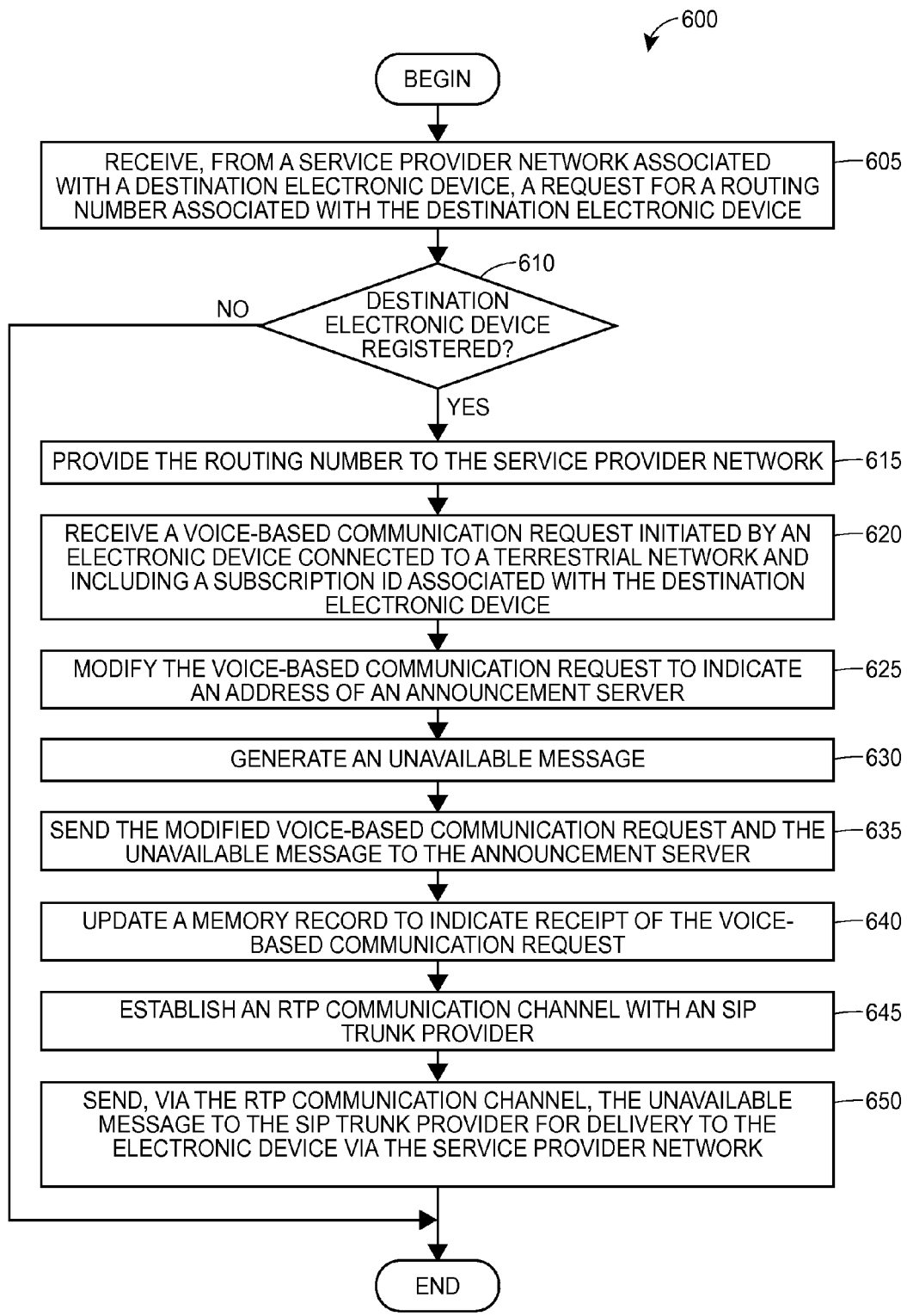
FIG. 6 depicts a flow diagram of a data center re-directing a voice-based communication that is intended for an electronic device connected to a non-terrestrial network, in accordance with some embodiments.

FIG. 6 illustrates an example method 600 for managing a voice-based communication request that is intended for an electronic device connected to a non-terrestrial-based (i.e., air-based) communication network. Further, the voice-based communication request may be initiated by an originating electronic device that is connected to a terrestrial-based network. The method 600 may operate in conjunction with any or all portions of the systems, vehicles, and/or electronic devices previously discussed with respect to FIGS. 1-5, or the method 600 may operate in conjunction with other suitable systems, vehicles, and/or electronic devices. In an embodiment, at least a portion of the method 600 may be performed by a data center including an SIP server, an SBC, a registration server, and/or an announcement server, such as the data center 129 as described with respect to FIG. 1.

At a block 605, the data center may receive, from a service provider network associated with a destination electronic device, a request for a routing number associated with the destination electronic device. According to embodiments, the request for the routing number is triggered by a voice call initiated by an originating electronic device, where the voice call is intended for the destination device. At a block 610, the data center can determine if the destination electronic device is registered with the on-board communications network system, such as if the HLR indicates that the destination electronic device is roaming in the data center network. In embodiments, the data center may store a data record associated with the destination electronic device (or an MSISDN/MDN of the destination electronic device), where the data record includes a voice communication disabled field (or similar type of record that indicates the unavailability of the destination electronic device). If the destination electronic device is registered ("YES"), processing can proceed to block 615. If the destination electronic device is not registered ("NO"), processing can end or proceed to any other functionality. At a block 615, the data center can provide the routing number to the service provider network. The routing number can be a TLDN associated with the destination device, and can be based on various parameters such as a flight type, a flight number, an airline carrier, and airline ID, or other parameters.

At a block 620, the data center can receive a voice-based communication request that is initiated by the originating electronic device, where the request includes a subscription ID associated with the destination electronic device. According to embodiments, the voice-based communication request can be an SIP invite request received from an SIP trunk provider and the subscription ID can be the routing number that the data center provided in block 615. At this point, the data center can deem that the destination electronic device is not authorized to receive a voice-based communication.

At a block 625, the data center can modify the voice-based communication request to indicate an address of an announcement server. Further, at a block 630, the data center can generate an unavailable message (e.g., in the form of an audio announcement) that indicates the unavailability of the destination electronic device, where the unavailable message may be customized to identify the destination electronic device. At a block 635, the data center can send the modified voice-based communication request and the unavailable message to the announcement server. At a block 640, the data center can update a memory record to indicate receipt of the voice-based communication request. The memory record can be specific to the destination electronic device, or to the flight or airline, or can be a general memory record that stores instances of voice-based communication attempts.

At a block 645, the data center can establish an RTP communication channel with an SIP trunk provider. At a block 650, the data center can send the unavailable message to the SIP trunk provider, whereby the SIP trunk provider is configured to deliver the unavailable message to the originating electronic device via the service provider network. Of course, the originating electronic device may annunciate the unavailable message to inform the user that the destination electronic device is unable to receive the voice call. Further, the data center can release the SIP session to terminate or end the call with the originating electronic device.

Figure 7:
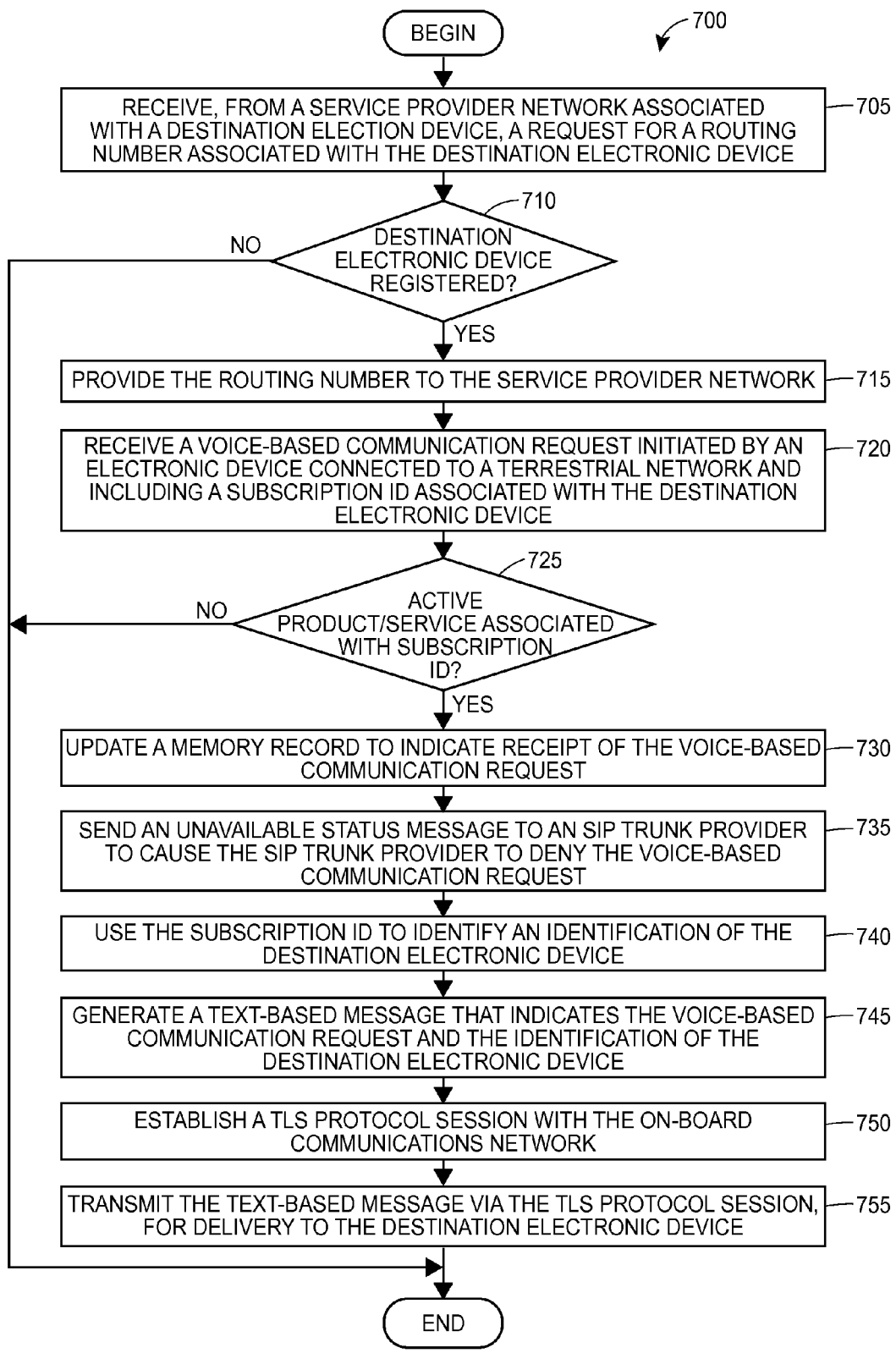
FIG. 7 depicts a flow diagram of a data center notifying an electronic device connected to a non-terrestrial network of a voice-based communication that is intended for the electronic device, in accordance with some embodiments.

FIG. 7 illustrates an example method 700 for managing a voice-based communication request that is intended for an electronic device connected to a non-terrestrial-based (i.e., air-based) communication network. Further, the voice-based communication request may be initiated by an originating electronic device that is connected to a terrestrial-based network. The method 700 may operate in conjunction with any or all portions of the systems, vehicles and/or electronic devices previously discussed with respect to FIGS. 1-5, or the method 700 may operate in conjunction with other suitable systems, vehicles, and/or electronic devices. In an embodiment, at least a portion of the method 700 may be performed by a data center including an SIP server, an SBC, and/or a registration server, such as the data center 129 as described with respect to FIG. 1.

At a block 705, the data center may receive, from a service provider network associated with a destination electronic device, a request for a routing number associated with the destination electronic device. According to embodiments, the request for the routing number is triggered by a voice call initiated by an originating electronic device, where the voice call is intended for the destination device. At a block 710, the data center can determine if the destination electronic device is registered with the on-board communications network system, such as if the destination electronic device previously completed an air-based registration. In embodiments, the data center may store a data record associated with the destination electronic device (or an MSISDN/MDN of the destination electronic device), where the data record includes a voice communication disabled field (or similar type of record that indicates the unavailability of the destination electronic device). If the destination electronic device is registered ("YES"), processing can proceed to block 715. If the destination electronic device is not registered ("NO"), processing can end or proceed to any other functionality. At a block 715, the data center can provide the routing number to the service provider network. The routing number can be a TLDN associated with the destination device, and can be based on various parameters such as a flight type, a flight number, an airline carrier, and airline ID, or other parameters.

At a block 720, the data center can receive a voice-based communication request that is initiated by the originating electronic device, where the request includes a subscription ID associated with the destination electronic device. According to embodiments, the voice-based communication request can be an SIP invite request received from an SIP trunk provider and the subscription ID can be the routing number that the data center provided in block 715. At this point, the data center can deem that the destination electronic device is not authorized to receive a voice-based communication.

At a block 725, the data center can determine if there is an active product or service associated with the subscription ID corresponding to the destination electronic device. In particular, a user of the destination electronic device can have previously selected (e.g., on an in-flight trip) a service or product from a list of available services or products that may include various cellular connectivity options for the destination electronic device that are based on time durations, data limits, or other parameters. If there is an active product or service ("YES"), processing can proceed to block 730. If there is not an active product or service ("NO"), processing may end or proceed to other functionality.

At a block 730, the data center can update a memory record to indicate receipt of the voice-based communication request. The memory record can be specific to the destination electronic device, or to the flight or airline, or can be a general memory record that stores instances of voice-based communication attempts. At a block 735, the data center can send an unavailable status message to an SIP trunk provider to cause the SIP trunk provider to deny the voice-based communication request. In particular, the SIP trunk provider can terminate the voice call that originated from the originating electronic device.

At a block 740, the data center can use the subscription ID to identify an identification of the destination electronic device. In particular, the identification of the destination electronic device can be the IMSI/MIN of the destination electronic device. At a block 745, the data center can generate a text-based message that indicates the voice-based communication request and the identification of the destination electronic device. In particular, the text-based message can indicate that the originating device is attempting to reach the destination electronic device.

At a block 750, the data center may establish a TLS protocol session with the on-board communications network system. At a block 755, the data center may transmit the text-based message via the TLS protocol session to the on-board communications network for delivery to the destination electronic device. In some embodiments, the data center can transmit an SIP message identifying the destination electronic device and including the text-based message to the on-board communication network for delivery to the destination electronic device. The data center may further receive an SIP 200 OK response indicating that the destination electronic device has received the text-based message.

Figure 8:
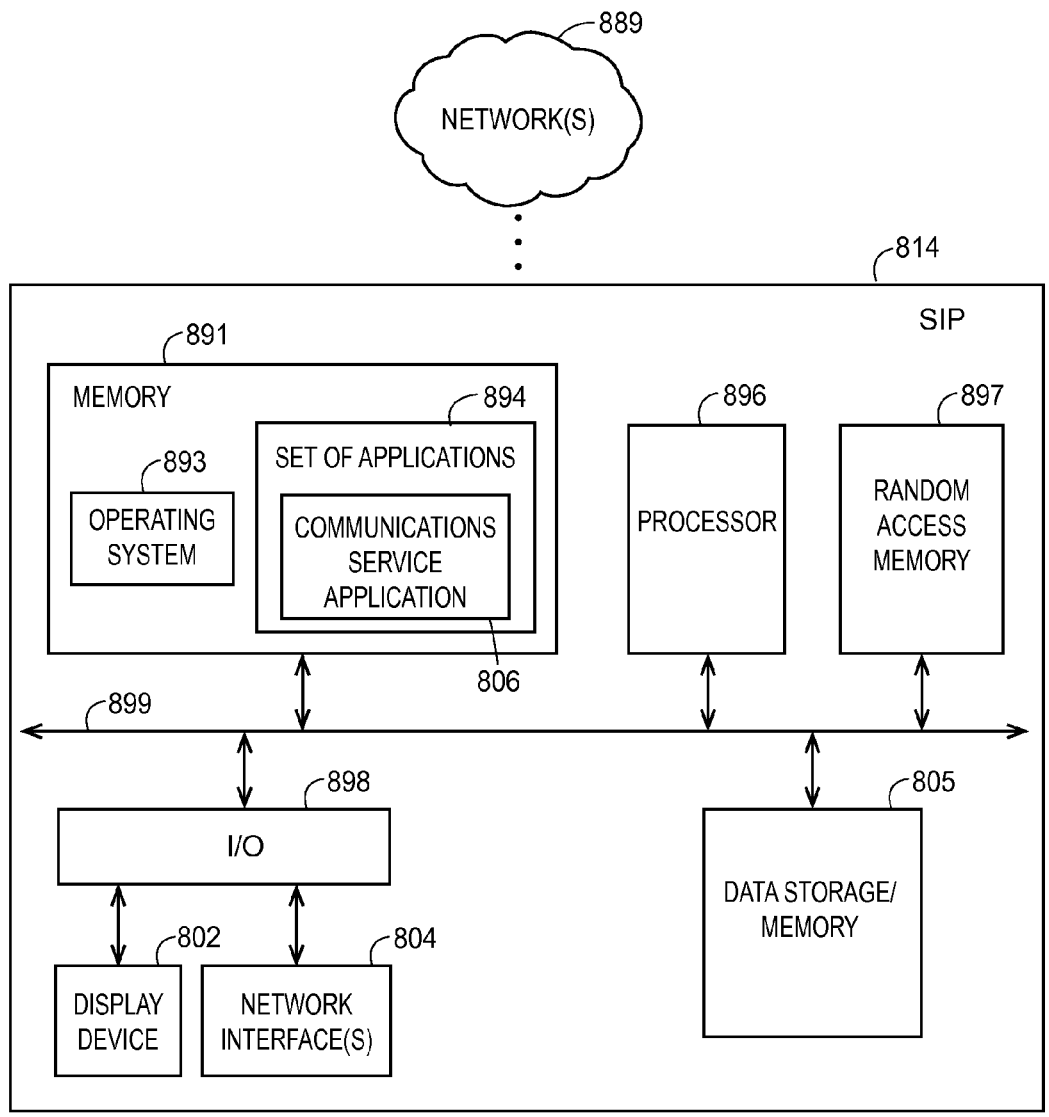
FIG. 8 is a block diagram of a registration server in accordance with some embodiments.

FIG. 8 illustrates a block diagram of an example SIP server 827 which may operate in accordance with any of (and/or any one or more portions of) the systems, methods, techniques and concepts discussed herein. In an embodiment, the SIP server 827 may be any of the SIP servers 127, 227, 327 as discussed with respect to FIGS. 1-3.

The SIP server 827 may include a processor 896 (which may be called a controller, microcontroller or a microprocessor, in some embodiments) for executing computer-executable instructions, a program memory 891 for permanently storing data related to the computer-executable instructions, a random-access memory (RAM) or other suitable memory 897 for temporarily storing data related to the computer-executable instructions, and an input/output (I/O) circuit or component 898, all of which may be interconnected via an address/data bus or suitable bus 899. As used herein, the terms "computer-executable instructions," "computer executable instructions," and "instructions" are used interchangeably.

The SIP server 827 may include one or more network interfaces 804 via which the SIP server 827 may wirelessly connect with one or more respective networks 889 or devices. Generally, the network interfaces 804 enable the SIP server 827 to connect to devices and entities over respective cellular radio frequency (RF) bands, e.g., AMPs, TDMA, CDMA, GSM, PCS, 3G, 4G, 5G, and/or any other terrestrial cellular radio frequency band. For example, the SIP server 827 may communicate with an electronic device via a terrestrial base station or small cell using one or the network interfaces 804. Generally, the term "cellular radio frequency band," as used herein, refers to a portion of RF spectrum that is allocated by a governmental agency or other body which governs the usage of spectrum. The one or more network interfaces 804 may enable the SIP server 827 to communicate over one or more cellular radio frequency bands (e.g., in terrestrial environments), and may include one or more corresponding transceivers. Although not shown in FIG. 8, the SIP server 827 may also include one or more wireless network interfaces that enable the SIP server 827 to communication via non-cellular-based networks, such as local area networks.

With further regard to FIG. 8, it should be appreciated that although only one processor 896 is shown, the SIP server 827 may include multiple processors 896. Similarly, the memory of the SIP server 827 may include multiple RAMs (Random Access Memories) 897, multiple program memories 891, and/or one or more other data storage entities or types of memories 805. The RAM(s) 897, program memories 891, and/or the data storage entities 805 may be implemented as one or more semiconductor memories, magnetically readable memories, optically readable memories, biological memories, and/or other tangible, non-transitory computer-readable storage media, for example.

Furthermore, the I/O circuit 898 may connect to a display device 802. For example, the display device 802 may enable a user or administrator of the SIP server 827 to manage the communication facilitation. The SIP server 827 may also include other elements common to general purpose computing devices (not shown).

The memory 891 can store an operating system 893 capable of facilitating the functionalities as discussed herein. The processor 896 can interface with the memory 891 to execute the operating system 893, as well as execute a set of applications 894 comprising computer-executable electronic instructions for facilitating various registration and communication facilitation features. In particular, the set of applications 894 can include a communications service application 806 configured to facilitate text- and voice-based communications discussed herein. It should be appreciated that other applications are envisioned.

In some embodiments, the computer-executable instructions for the set of applications 894 may be configured to cause the SIP server 827 to perform one or more portions of one or more of the methods described herein. The computer-executable instructions may be stored on a tangible, non-transitory computer-readable storage medium, such as on the memory 891 or on some other suitable memory. Furthermore, the computer-executable instructions may be executable by the one or more processors 896. The computer-executable instructions may be downloaded or otherwise delivered to the SIP server 827.

Figure 9:
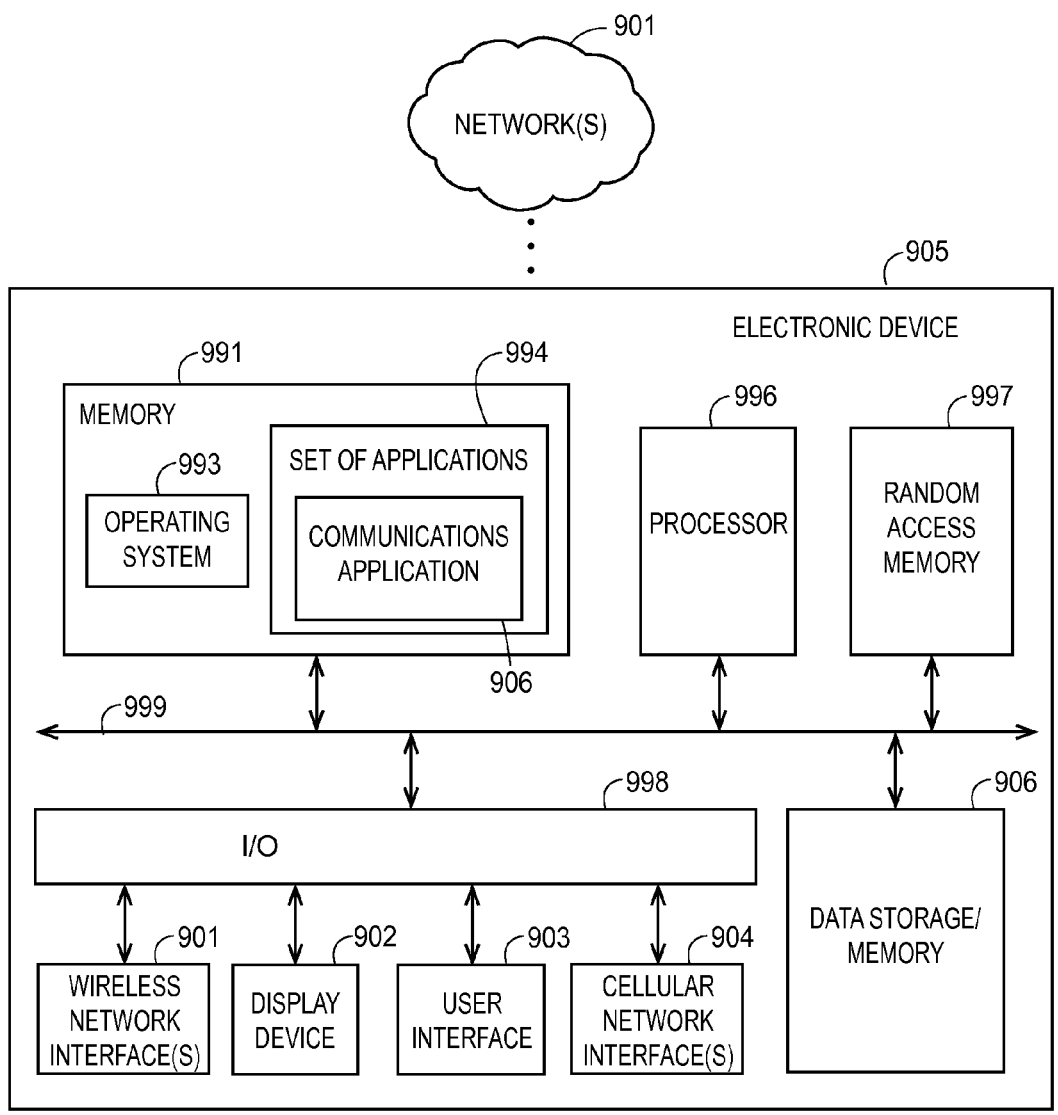
FIG. 9 is a block diagram of an electronic device in accordance with some embodiments.

FIG. 9 illustrates a block diagram of an example electronic device 905 which may operate in accordance with any of (and/or any one or more portions of) the systems, methods, techniques and concepts discussed herein. The electronic device 905 may be, for example, a smart phone, a smart device, a laptop, a tablet, an electronic reading device, or any other communications or computing device that is configured to communicate wirelessly. In an embodiment, the electronic device 905 may be the any of the electronic devices 105, 205, 305 (or any of the additional devices 110, 210, 310) as described with respect to FIGS. 1-3.

The electronic device 905 may include a processor 996 (which may be called a controller, microcontroller or a microprocessor, in some embodiments) for executing computer-executable instructions, a program memory 991 for permanently storing data related to the computer-executable instructions, a random-access memory (RAM) or other suitable memory 997 for temporarily storing data related to the computer-executable instructions, and an input/output (I/O) circuit or component 998, all of which may be interconnected via an address/data bus or suitable bus 999. As used herein, the terms "computer-executable instructions," "computer executable instructions," and "instructions" are used interchangeably.

The electronic device 905 may include one or more wireless network interfaces 901 via which the electronic device 905 may wirelessly connect with one or more networks 989 or devices. In an embodiment, the one or more wireless network interfaces 901 enable the electronic device 905 to wirelessly connect to one or more other networks or devices that are included or contained in a terrestrial or a non-terrestrial environment. For example, the electronic device 905 may communicatively connect to a non-terrestrial, local network (e.g., a non-terrestrial wireless Local Area Network (LAN) hosted on-board a vehicle) using a wireless Ethernet protocol over one of the wireless network interfaces 901. Additionally or alternatively, the electronic device 905 may communicatively connect to a local wireless network or device using a Near Field Communications (NFC) protocol (e.g., Bluetooth) over one of the wireless network interfaces 901. Generally, the one or more wireless network interfaces 901 may support any radio frequency band other than cellular radio frequency bands, and the one or more wireless network interfaces 901 may include one or more corresponding transceivers. In an embodiment, the wireless network interfaces 901 communicates with a wireless access point (such as a wireless access point on an airplane), which allows the electronic device 905 to connect to an on-board network.

The electronic device 905 may further include one or more cellular wireless interfaces 904 to support communications over respective cellular radio frequency (RF) bands, e.g., AMPs, TDMA, CDMA, GSM, PCS, 3G, 4G, 5G, and/or any other terrestrial cellular radio frequency band. For example, the electronic device 905 may communicate with a terrestrial base station or small cell using one or the cellular network interfaces 904. Further, the electronic device 905 may communicate with a registration server (such as the registration server 914 as described with respect to FIG. 9) over a WAN using one of the cellular network interfaces 904. Generally, the term "cellular radio frequency band," as used herein, refers to a portion of RF spectrum that is allocated by a governmental agency or other body which governs the usage of spectrum. The cellular network interfaces 904 may allow the electronic device 905 to communicate over one or more cellular radio frequency bands (e.g., in terrestrial environments), and may include one or more corresponding transceivers. In an embodiment, the one or more cellular network interfaces 904 are not used by the electronic device 905 to communicate in non-terrestrial environments. In an embodiment, the one or more wireless network interfaces 901 and the one or more cellular network interfaces 904 may each be independently activated and deactivated.

With further regard to FIG. 9, it should be appreciated that although only one processor 996 is shown, the electronic device 905 may include multiple processors 996. Similarly, the memory of the electronic device 905 may include multiple RAMs (Random Access Memories) 997, multiple program memories 991, and/or one or more other data storage entities or types of memories 906. The RAM(s) 997, program memories 991, and/or the data storage entities 906 may be implemented as one or more semiconductor memories, magnetically readable memories, optically readable memories, biological memories, and/or other tangible, non-transitory computer-readable storage media, for example.

Furthermore, although the I/O circuit 998 is shown as a single block, it should be appreciated that the I/O circuit 998 may include a number of different types of I/O circuits or connections. For example, a first I/O circuit may correspond to a display device 902, and the first or a second I/O circuit may correspond to a user interface 903. The user interface 903 in combination with the display device 902 may include various I/O components (e.g., capacitive or resistive touch sensitive input panels, keys, buttons, lights, LEDs, cursor control devices, haptic devices, and others). In embodiments, the display device 902 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 903 may further include audio components such as a microphone and/or a speaker. The electronic device 905 may also include other elements common to general purpose computing devices (not shown).

The memory 991 can store an operating system 993 capable of facilitating the functionalities as discussed herein.

The processor 996 can interface with the memory 991 to execute the operating system 993 as well as execute a set of applications 994 comprising computer-executable electronic instructions for facilitating various registration features. In particular, the set of applications 994 can include a communication application 906 configured to facilitate the communications as discussed herein. For example, the communication application 906 can initiate and receive text- and voice-based communications. It should be appreciated that other applications are envisioned, such as a dedicated SMS messaging application.

In some embodiments, the computer-executable instructions for the set of applications 994 may be configured to cause the electronic device 905 to perform one or more portions of one or more of the methods described herein. The computer-executable instructions may be stored on a tangible, non-transitory computer-readable storage medium, such as on the memory 991 or on some other suitable memory. Furthermore, the computer-executable instructions may be executable by the one or more processors 996. The computer-executable instructions may be downloaded or otherwise delivered to the electronic device 905.

Of course, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method of processing communication requests intended for a destination electronic device connected to an on-board communications network of a vehicle, the method comprising:
   receiving a voice-based communication request associated with a voice-based call that is (1) initiated by an electronic device connected to a terrestrial network and (2) intended for the destination electronic device, including:
      receiving a session initiation protocol (SIP) invite request from a SIP trunk provider on behalf of a mobile switching center (MSC), wherein the SIP invite request comprises a routing number, and
      translating the routing number into a subscription identification associated with the destination electronic device;
   using, by a processor, the subscription identification to identify an identification of the destination electronic device;
   sending an unavailable status message to the SIP trunk provider to cause the SIP trunk provider to terminate the voice-based call with the electronic device;

generating, by the processor, a text-based message that indicates the voice-based communication request and the identification of the destination electronic device;

transmitting the text-based message to the on-board communications network for delivery to the destination electronic device; and updating a memory record associated with the vehicle to indicate receipt of the voice-based communication request.

2. The method of claim 1, wherein generating the text-based message comprises:

generating a session initiation protocol (SIP) message comprising body text data, wherein the body text data references the voice-based communication request and is configured to be presented to a user of the destination electronic device.

3. The method of claim 1, wherein the identification of the destination electronic device is one of an international mobile subscriber identify (IMSI) or a mobile identification number (MIN), and the subscription identification is temporary local directory number (TLDN).

4. The method of claim 1, wherein transmitting the text-based message comprises:

establishing a transport layer security (TLS) protocol session with the on-board communications network; and transmitting the text-based message via the TLS protocol session.

5. The method of claim 1, further comprising:

determining that there is an active product or service associated with the subscription identification associated with the destination electronic device.

6. The method of claim 1, further comprising:

receiving a request for the routing number from a service provider network associated with the destination electronic device; and providing the routing number to the service provider network.

7. The method of claim 6, wherein the request for the routing number comprises one of a mobile subscriber integrated services for digital network (MSISDN) number or a mobile directory number (MDN) of the destination electronic device, and wherein the method further comprises:

examining a data record associated with the one of the MSISDN or the MDN to determine that the destination electronic device is registered with the on-board communications network.

8. The method of claim 1, wherein transmitting the text-based communication comprises:

generating a session initiation protocol (SIP) message comprising the text-based message and specifying the identification of the destination electronic device;

forwarding the SIP message to the on-board communications network for delivery to the destination electronic device; and receiving an SIP 200 OK response from the on-board communications network, the SIP 200 OK response indicating that the destination electronic device received the text-based communication.

9. A system for processing communication requests intended for a destination electronic device connected to an on-board communications network of a vehicle, comprising:

a communication module configured to send and receive data; and a data center communicatively connected to the communication module and configured to:

receive, via the communication module, a voice-based communication request associated with a voice-based call that is (1) initiated by an electronic device connected to a terrestrial network and (2) intended for the destination electronic device, including:

receive a session initiation protocol (SIP) invite request from a SIP trunk provider on behalf of a mobile switching center (MSC), wherein the SIP invite request comprises a routing number, and translate the routing number into a subscription identification associated with the destination electronic device, use the subscription identification to identify an identification of the destination electronic device, send an unavailable status message to the SIP trunk provider to cause the SIP trunk provider to terminate the voice-based call with the electronic device, generate a text-based message that indicates the voice-based communication request and the identification of the destination electronic device, transmit, via the communication module, the text-based message to the on-board communications network for delivery to the destination electronic device, and update a memory record associated with the vehicle to indicate receipt of the voice-based communication request.

10. The system of claim 9, wherein the data center generates the text-based message as a session initiation protocol (SIP) message comprising body text data, wherein the body text data references the voice-based communication request and is configured to be presented to a user of the destination electronic device.

11. The system of claim 9, wherein the identification of the destination electronic device is one of an international mobile subscriber identity (IMSI) or a mobile identification number (MIN) and the subscription identification is temporary local directory number (TLDN).

12. The system of claim 9, wherein to transmit the text-based message, the data center is configured to:

establish a transport layer security (TLS) protocol session with the on-board communications network, and transmit the text-based message via the TLS protocol session.

13. The system of claim 9, wherein the data center is further configured to:

determine that there is an active product or service associated with the subscription identification associated with the destination electronic device.

14. The system of claim 9, wherein the data center is further configured to:

receive a request for the routing number from a service provider network associated with the destination electronic device, and provide the routing number to the service provider network.

15. The system of claim 14, wherein the request for the routing number comprises one of a mobile subscriber integrated services for digital network (MSISDN) number or a mobile directory number (MDN) of the destination electronic device, and wherein the data center is further configured to:

examine a data record associated with the one of the MSISDN or the MDN to determine that the destination electronic device is registered with the on-board communications network.

16. The system of claim 9, wherein to transmit the text-based communication, the data center is configured to:

generate a session initiation protocol (SIP) message comprising the text-based message and specifying the identification of the destination electronic device,
forward the SIP message to the on-board communications network for delivery to the destination electronic device, and
receive an SIP 200 OK response from the on-board communications network, the SIP 200 OK response indicating that the destination electronic device received the text-based communication.

* * * * *